UNITED STATES PATENT OFFICE.

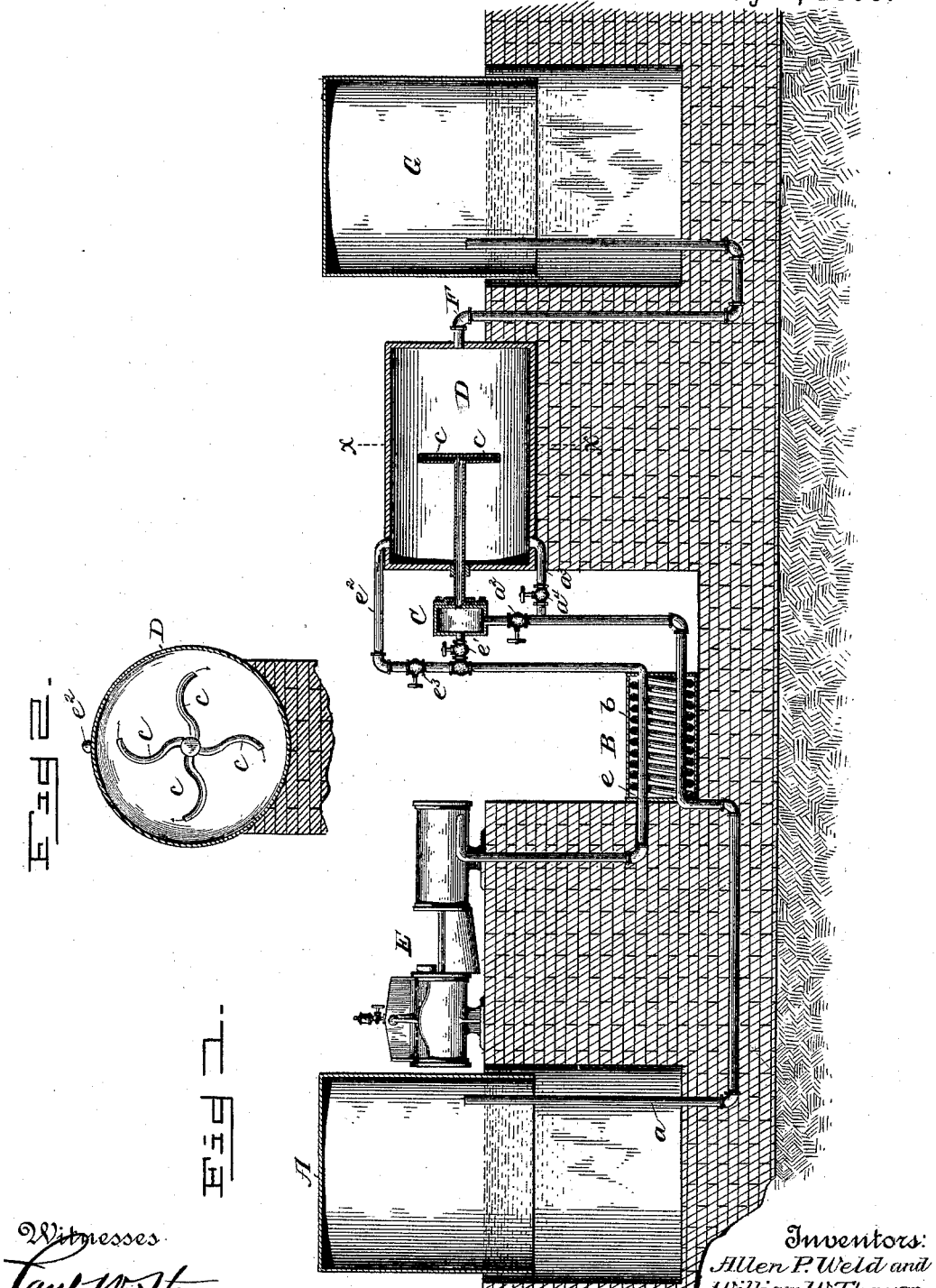

WILLIAM W. THAYER AND ALLEN P. WELD, OF RIVER FALLS, WISCONSIN.

APPARATUS FOR MIXING AIR AND GAS.

SPECIFICATION forming part of Letters Patent No. 497,221, dated May 9, 1893.

Application filed August 2, 1892. Serial No. 441,966. (No model.)

*To all whom it may concern:*

Be it known that we, WILLIAM W. THAYER and ALLEN P. WELD, citizens of the United States, residing at River Falls, in the county of Pierce and State of Wisconsin, have invented certain new and useful Improvements in Apparatus for Mixing Air and Gas; and we do hereby declare the following to be a full, clear, and exact description of the invention, such as will enable others skilled in the art to which it appertains to make and use the same.

This invention relates to the apparatus for mixing air and gas.

The object of the invention is to produce a simple and effective apparatus, whereby illuminating gas may be intimately and perfectly mixed with atmospheric air before being turned into the mains, thus supplying very rich gas with the oxygen needed to insure perfect combustion.

The object of the invention is furthermore, to produce an apparatus whereby gas may be mixed with air while both the gas and the air are in a heated condition, without danger of igniting the gas, thereby producing a perfect admixture and supplying very rich gas with the oxygen requisite for combustion.

With these objects in view, the invention consists essentially in an apparatus comprising a gasometer and an air-forcing device, conduits leading from the gasometer and from the air-forcing device, a heating apparatus consisting essentially of steam coils, and a mixing chamber.

The invention furthermore, consists in an apparatus comprising a gasometer, an air-forcing device, conduits leading from the gasometer and the air-forcing device, a heater consisting essentially of steam coils in close proximity to which the conduits pass, a mixing chamber and an agitating device arranged within the chamber.

The invention furthermore, consists in an apparatus for mixing gas and air, comprising a gasometer and an air-forcing device, a heater consisting of steam coils, a mixing chamber, separate conduits for the gas and air, leading from the heater, the conduits being connected with a hollow shaft projecting into the mixing-chamber, the hollow shaft being provided with hollow radial arms having openings near their outer ends forming a Barker's mill.

The invention furthermore, consists in an apparatus for mixing gas and air, comprising a gasometer and an air-forcing apparatus, a heater comprising steam coils, separate conduits for the gas and air leading from the heater, a mixing chamber, a hollow shaft projecting into the mixing chamber to which are connected the conduits for the gas and air, the hollow shaft being provided with hollow radial arms having openings near their ends, branch pipes connecting the conduits for air and gas directly with the mixing chamber, and cocks in the conduits and in the branch pipes whereby the air and gas from the heater may be caused to pass through the hollow shaft or directly into the mixing chamber.

The invention is illustrated in the accompanying drawings, in which—

Figure 1— is a sectional view of an apparatus constructed in accordance with our invention; and Fig. 2— is a section on the line $x$—$x$ of Fig. 1.

In the drawings, A represents a storage gasometer of any convenient size provided with an outlet pipe or conduit $a$ leading to a heating apparatus B, which consists essentially of steam coils $b$ presenting any desired area of heating surfaces and arranged in close proximity to the conduit $a$, insuring the heating of the gas passing from the same. The conduit $a$ after passing through the heater, extends to a hollow shaft C which extends into the mixing chamber D. The shaft C is suitably mounted in tight bearings allowing its free rotation, and is provided at its inner ends with radial hollow arms $c$ communicating with the interior of the shaft and having openings near their outer ends forming a Barker's mill. The conduit $a$ is provided before its juncture with the hollow shaft C with a cock $a^2$. A branch pipe $a^3$ connects the conduit $a$ directly with the mixing chamber D, and this branch pipe is provided with a cock $a^4$.

E represents any suitable air-forcing device, which, in the present instance, is shown as being an air-pump. With the air forcing device is connected the conduit $e$ joining the air-forcing device with the hollow shaft C. The conduit $e$ is provided with a cock $e'$ whereby communication between it and the hollow shaft C may be cut off.

$e^2$ represents a branch pipe which directly connects the conduit $e$ with the mixing chamber D and this is provided with a stop-cock $e^3$. By the arrangement of the conduit $e$ and its branch pipe with their stop-cocks, it will be clear that air may be made to pass either through the hollow shaft C, or directly into the mixing chamber.

By the arrangement of the apparatus described, a thorough mixing of the air and gas while in a heated condition and at the same temperature, may be accomplished either by passing them simultaneously through the Barker's mill, or passing one directly into the mixing chamber and the other through the Barker's mill, or by passing them both directly into the mixing chamber and agitating them therein by a fan or other suitable device.

It is not absolutely essential to employ the Barker's mill, as a fan driven by extraneous mechanism may be employed in the mixing. A conduit F connects the mixing chamber D with a gas holder G from which the mains are to be supplied.

By the use of the apparatus herein described, we are enabled to effectually heat the gas and air by means whereby possibility of explosions is prevented and we are also enabled to regulate the heat and to supply the gas and air in proper quantity.

The heating of the gas and air previous to mixing is of very great advantage, as it insures a more complete and perfect admixture of the air and gas than can be obtained by other means. It will also be clear that by the employment of the apparatus, herein described, much time is saved in preparing the gas for use.

Having thus fully described our invention, what we claim as new, and desire to secure by Letters Patent, is—

1. An apparatus for mixing air and gas, comprising a gasometer, an air-forcing device, conduits leading from the gasometer and from the air-forcing device, a heating apparatus in close proximity to which the conduits from the air-forcing device and gasometer pass, said heating apparatus consisting essentially of steam coils, and a mixing-chamber, the heating apparatus being located between the gasometer and air-forcing device on the one side and the mixing chamber on the other side, substantially as described.

2. An apparatus for mixing air and gas, comprising a gasometer, an air forcing device, conduits leading from the gasometer and from the air-forcing device, a heater consisting of steam coils in close proximity to which the conduits pass, a mixing-chamber placed adjacent to the heating device and entered by the conduits after passing through the heating device, and an agitating device arranged within the mixing-chamber, substantially as described.

3. An apparatus for mixing air and gas, comprising a gasometer, an air-forcing device, a heater consisting of steam coils, a mixing-chamber, and separate conduits for the gas and air leading from the gasometer and from the air-forcing device through the heater, the conduits being connected by a hollow shaft projecting into the mixing-chamber, the hollow shaft being provided with hollow radial arms having openings near their outer ends, forming a Barker's mill, substantially as described.

4. An apparatus for mixing gas and air, comprising a gasometer, an air forcing device, a heater consisting of steam coils, separate conduits for the gas and air leading from the gasometer and from the air-forcing device, and passing through the heater, a mixing-chamber, a hollow shaft projecting into the mixing chamber to which are connected the conduits for the gas and air, the hollow shaft being provided with hollow radial arms having openings near their ends, branch pipes connecting the conduits for the air and gas directly with the mixing-chamber, and cocks in the conduits and in the branch pipes whereby the air and gas from the heater may be caused to pass through the hollow shaft or directly into the mixing-chamber, substantially as described.

In testimony whereof we affix our signatures in presence of two witnesses.

WILLIAM W. THAYER.
ALLEN P. WELD.

Witnesses:
C. F. WINTER,
GEO. J. KOBERSTEIN.